(12) United States Patent
Gibson et al.

(10) Patent No.: US 10,261,742 B2
(45) Date of Patent: Apr. 16, 2019

(54) VISUAL FOCUS-BASED CONTROL OF COUPLES DISPLAYS

(71) Applicant: Microsoft Technology Licensing, LLC, Redmond, WA (US)

(72) Inventors: Tyler Edward Gibson, Seattle, WA (US); Monty Lee Hammontree, Duvall, WA (US); Vikram Bapat, Seattle, WA (US); Emmanuel John Athans, Lake Forest Park, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 39 days.

(21) Appl. No.: 15/488,020

(22) Filed: Apr. 14, 2017

(65) Prior Publication Data
US 2017/0220308 A1    Aug. 3, 2017

Related U.S. Application Data

(63) Continuation of application No. 13/249,239, filed on Sep. 30, 2011, now Pat. No. 9,658,687.

(51) Int. Cl.
*G06F 3/14*    (2006.01)
*G06F 3/01*    (2006.01)
*G06F 3/041*   (2006.01)

(52) U.S. Cl.
CPC ............ *G06F 3/1423* (2013.01); *G06F 3/012* (2013.01); *G06F 3/013* (2013.01); *G06F 3/0416* (2013.01);
(Continued)

(58) Field of Classification Search
CPC ....... G09G 2370/24; G06F 3/12; G06F 3/013; G06F 3/1423
See application file for complete search history.

(56) References Cited

U.S. PATENT DOCUMENTS 7,331,929 B2    2/2008  Morita et al.
7,545,362 B2    6/2009  Kong
(Continued)

FOREIGN PATENT DOCUMENTS

JP    2009118423 A    5/2009
JP    2009301166 A    12/2009
(Continued)

OTHER PUBLICATIONS

"Office Action Issued in European Patent Application No. 12836612.7", dated Nov. 8, 2017, 7 Pages.
(Continued)

*Primary Examiner* — Diane M Wills
(74) *Attorney, Agent, or Firm* — Medley, Behrens & Lewis, LLC

(57) ABSTRACT

Various technologies described herein pertain to controlling functionality of a display based on visual focus of a user in a multiple display or multiple computational device environment. A particular display from a set of displays on which a user is visually focused is identified. The set of displays includes at least a first display and a second display. Moreover, a type of input receivable from the user via the first display and/or content rendered on the first display is controlled based on the visual focus of the user.

20 Claims, 9 Drawing Sheets

(52) U.S. Cl.
CPC .......... *G06F 3/1438* (2013.01); *G06F 3/1454* (2013.01); *G09G 2354/00* (2013.01); *G09G 2370/06* (2013.01); *G09G 2370/24* (2013.01)

(56) References Cited

U.S. PATENT DOCUMENTS

| | | | |
|---|---|---|---|
| 7,561,143 | B1 | 7/2009 | Milekic |
| 7,987,423 | B2 | 7/2011 | Wu et al. |
| 8,793,620 | B2 | 7/2014 | Stafford |
| 2004/0201628 | A1 | 10/2004 | Johanson et al. |
| 2004/0240708 | A1 | 12/2004 | Hu et al. |
| 2005/0190144 | A1 | 9/2005 | Kong |
| 2006/0037038 | A1* | 2/2006 | Buck ............... G06F 3/013 725/9 |
| 2006/0109238 | A1 | 5/2006 | Lau et al. |
| 2007/0162922 | A1 | 7/2007 | Park |
| 2008/0024433 | A1 | 1/2008 | Gunther et al. |
| 2008/0036875 | A1 | 2/2008 | Jones et al. |
| 2008/0120553 | A1 | 5/2008 | Bergman et al. |
| 2009/0096885 | A1 | 4/2009 | Robinson et al. |
| 2009/0249245 | A1 | 10/2009 | Watanabe |
| 2009/0315827 | A1 | 12/2009 | Elvesjo et al. |
| 2010/0049704 | A1 | 2/2010 | Sumiya |
| 2010/0130280 | A1 | 5/2010 | Arezina et al. |
| 2010/0146461 | A1 | 6/2010 | Ryu et al. |
| 2010/0171808 | A1 | 7/2010 | Harrell et al. |
| 2011/0210922 | A1 | 9/2011 | Griffin |
| 2012/0007811 | A1 | 1/2012 | Peng |
| 2012/0162204 | A1 | 6/2012 | Vesely et al. |
| 2012/0300061 | A1 | 11/2012 | Osman et al. |
| 2012/0313857 | A1 | 12/2012 | Senanayake et al. |
| 2013/0083025 | A1 | 4/2013 | Gibson et al. |

FOREIGN PATENT DOCUMENTS

| | | |
|---|---|---|
| JP | 2009301166 A1 * | 12/2009 |
| KR | 20100038897 A | 4/2010 |

OTHER PUBLICATIONS

Fono, et al., "EyeWindows: Evaluation of Eye-Controlled Zooming Windows for Focus Selection", Retrieved at <<http://eso.vse.cz/~labsky/pdf/p151.pdf>>, Proceedings of the SIGCHI conference on Human factors in computing systems, Apr. 2-7, 2005, pp. 151-160.

Kern, et al., "Gazemarks—Gaze-Based Visual Placeholders to Ease Attention Switching", Retrieved at <<http://www.pervasive.wiwi.uni-due.de/uploads/tx_itochairt3/publications/kernCHI10_03.pdf>>, Proceedings of the 28th international conference on Human factors in computing systems, Apr. 10-15, 2010, 10 Pages.

"Smart Board™ 8070i Interactive Display", Retrieved at <<http://www.easy.co.uk/Content/PDF/Whiteboards/SMART_Board%C3%A2_%C2%A2_8070i_interactive_display_-_Fact_Sheet_24-02-2011_16-37.pdf>>, Retrieved Date: Jul. 18, 2011, 2 Pages.

"Human-Computer Interaction and Eye Tracking", Retrieved at <<http://www.tobii.com/en/analysis-and-research/global/research/human-computer-interaction/>>, Retrieved Date: Jul. 18, 2011, 2 Pages.

Ajanki, et al., "Ubiquitous Contextual Information Access with Proactive Retrieval and Augmentation", Retrieved at <<http://research.ics.tkk.fi/mi/papers/iwuvr10.pdf>>, Proceedings of 4th International Workshop on Ubiquitous Virtual Reality, 2009, 5 Pages.

"Response to the Office Action for Japanese Patent Application No. 2014-533566", Filed Date: Oct. 7, 2016, 18 Pages.

"Office Action for Japanese Patent Application No. 2014-533566", dated Jul. 7, 2016, 11 Pages.

"First Office Action and Search Report Issued in Chinese Patent Application No. 201210376124.0", dated Oct. 23, 2014, 12 Pages.

"Notice of Allowance for Japanese Patent Application No. 2014-533566", dated Nov. 11, 2016, 4 Pages.

"Notice of Allowance Issued in Chinese Patent Application No. 201210376124.0", dated Oct. 30, 2015, 4 Pages.

"Response to the Office Action for Chinese Patent Application No. 201210376124.0", Filed Date: Jul. 8, 2015, 22 pages.

"Second Office Action Issued in Chinese Patent Application No. 201210376124.0", dated Apr. 23, 2015, 6 Pages.

"International Search Report", dated Mar. 4, 2013, Application No. PCT/US2012/054703, Filed Date: Sep. 12, 2012, pp. 10.

"Supplementary Search Report issued in European Patent Application No. 12836612.7", dated Mar. 11, 2015, 9 Pages.

"Non-Final Office Action for U.S. Appl. No. 13/249,239", dated Aug. 23, 2013, 50 Pages.

"Response to the Non-Final Office Action for U.S. Appl. No. 13/249,239", filed Feb. 12, 2014, 20 Pages.

"Final Office Action for U.S. Appl. No. 13/249,239", dated Apr. 22, 2014, 39 Pages.

"Response to the Final Office Action for U.S. Appl. No. 13/249,239", filed Aug. 29, 2014, 18 Pages.

"Non-Final Office Action for U.S. Appl. No. 13/249,239", dated Oct. 2, 2014, 22 Pages.

"Response to the Non-Final Office Action for U.S. Appl. No. 13/249,239", filed Mar. 12, 2015, 20 Pages.

"Final Office Action for U.S. Appl. No. 13/249,239", dated Jun. 3, 2015, 19 Pages.

Wikipedia, "Remote Desktop Protocol" [online], Wikipedia, Aug. 18, 2010 [retreived on May 21, 2015]. Retrieved from the Internet: <URL: http://en.wikipedia.org/wiki/Remote_Desktop_Protocol>.

"Response to the Final Office Action for U.S. Appl. No. 13/249,239", filed Dec. 3, 2015, 25 Pages.

"Non-Final Office Action for U.S. Appl. No. 13/249,239", dated Feb. 2, 2016, 21 Pages.

"Response to the Non-Final Office Action for U.S. Appl. No. 13/249,239", filed Jul. 29, 2016, 23 Pages.

"Final Office Action for U.S. Appl. No. 13/249,239", dated Sep. 27, 2016, 8 Pages.

"Response to the Final Office Action for U.S. Appl. No. 13/249,239", filed Dec. 20, 2016, 12 Pages.

"Notice of Allowance and Fees Due for U.S. Appl. No. 13/249,239", dated Jan. 31, 2017, 10 Pages.

* cited by examiner

US 10,261,742 B2

VISUAL FOCUS-BASED CONTROL OF COUPLES DISPLAYS

RELATED APPLICATION

This application is a continuation of U.S. patent application Ser. No. 13/249,239, filed on Sep. 30, 2011, and entitled "VISUAL FOCUS-BASED CONTROL OF COUPLED DISPLAYS", the entirety of which is incorporated herein by reference.

BACKGROUND

Computational devices oftentimes interface with a display. For instance, a computational device can be coupled with a display and/or include a display. A conventional user experience typically involved a computational device outputting content on a single display, which can be viewable by a user. Eventually, use of multiple display environments, where a plurality of displays run on a single computational device, became more prevalent. Employing the plurality of displays with the computational device increases the display real estate on which content can be rendered by the computational device. According to an illustration, the computational device can render content associated with a word processing application on one display, and content associated with a spreadsheet application on another display.

A more recent trend is the interaction of multiple computational devices with each other to support a user experience across the displays respectively associated with such computational devices (e.g., a multiple computational device environment). According to an example, a user can watch a television program in her living room on a television that is coupled to a media center and can change the channel, volume, or the like using an application that is executed on her smartphone. However, as the number of displays employed as part of a multiple display or multiple computational device environment increases, functionality of some of the displays may be inefficiently unutilized or underutilized by the user. For instance, when functionality of one display in a multiple display or multiple computational device environment is employed by the user, functionality of another display may be unused or underused by the user.

SUMMARY

Described herein are various technologies that pertain to using visual focus of a user to control display functionality. Visual focus information, which specifies a particular display from a set of displays on which the user is visually focused, can be received. The set of displays can include at least a first display and a second display. According to some embodiments, the first display and the second display can respectively interface with a first computational device and a second computational device, and the first computational device and the second computational device can interact. In other embodiments, the first display and the second display can interface with a shared computation device. Further, the type of input that the first display is configured to receive from the user can be controlled based on the visual focus information. Additionally or alternatively, content rendered on the first display can be controlled based on the visual focus information.

In various embodiments, a visual focus of the user can be identified as being on the first display or on the second display. For instance, the first display can be a touch enabled display. Moreover, the visual focus of the user can be identified from received visual focus information or through detection by using an output of a sensor. Further, content rendered on the first display and a type of input that can be receivable from the user can be controlled based on whether the visual focus of the user is on the first display or the second display.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
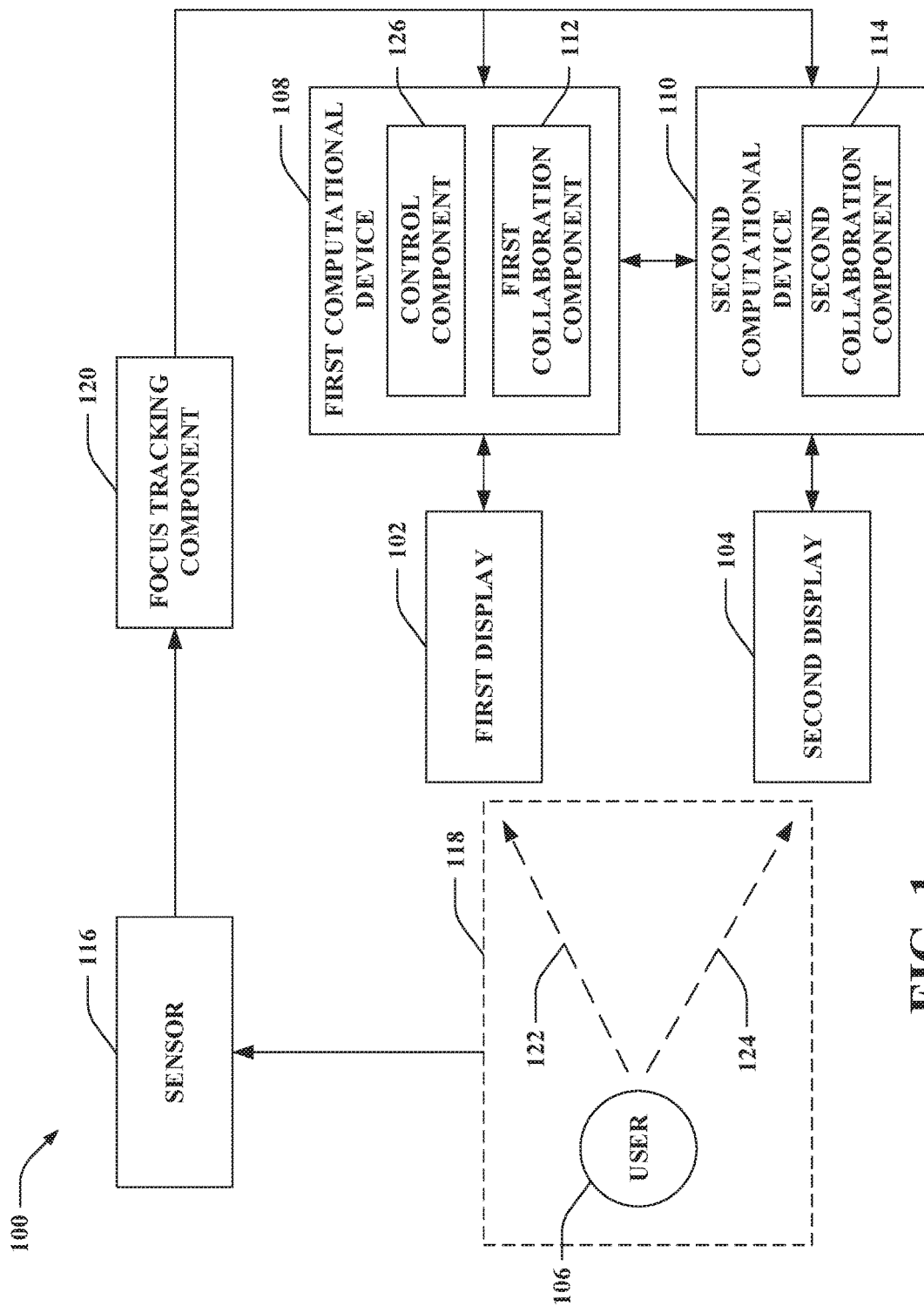
FIG. 1 illustrates a functional block diagram of an exemplary system that controls functionality of a display using visual focus in an environment that includes multiple displays.

Various technologies pertaining to controlling functionality of a display based upon visual focus of a user in an environment that includes multiple displays are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As set forth herein, visual focus of a user can be detected and utilized to control functionality of a display in a multiple display or multiple computational device environment, collectively referred to herein as an environment that includes multiple displays. For instance, a set of displays can be coupled in an environment that includes multiple displays. Further, content rendered on the display can be changed based on whether the visual focus of the user is on the display or on a different display. Additionally or alternatively, a type of input that can be receivable from the user via the display can be varied based on whether the visual focus of the user is on the display or on a disparate display.

Referring now to the drawings, FIG. 1 illustrates a system 100 that controls functionality of a display using visual focus in an environment that includes multiple displays. The system 100 includes a first display 102 and a second display 104. The first display 102 is controlled as a function of a visual focus of the user 106. It is further contemplated that the second display 104 can be controlled as a function of the visual focus of the user 106; however, it is to be appreciated that the claimed subject matter is not so limited. While the system 100 is depicted as including two displays, it is to be appreciated that the system 100 can include substantially any number of displays in addition to the first display 102 and the second display 104.

In various embodiments described herein, the first display 102 is a touch enabled display (e.g., where an input is receivable by the first display 102). According to such embodiments, the touch enabled display can receive an input from the user 106 and render an output to the user 106. For instance, the touch enabled display can receive an input from the user 106 by detecting touches (e.g., by a finger, a tool that applies pressure such as a pen, etc.), gestures, and so forth. Moreover, in other embodiments described herein, the first display 102 can be a touch enabled display or a non-touch enabled display. A non-touch enabled display, for instance, can render an output to the user 106 while lacking functionality for receiving an input from the user 106. Similarly, it is contemplated that the second display 104 is a touch enabled display in some embodiments and can be a touch enabled display or a non-touch enabled display in other embodiments.

Moreover, a first computational device 108 interfaces with the first display 102 in the system 100. The first computational device 108 can interface with the first display 102 to output data (e.g., render images, text, graphics, etc.) via the first display 102. Further, the first computational device 108 can interface with the first display 102 to receive an input via the first display 102. For example, the first computational device 108 can be coupled with the first display 102. Following this example, the first display 102 can be an external display that can be connected directly or indirectly with the first computational device 108 (e.g., via wired and/or wireless connection(s)). According to another example, the first computational device 108 can comprise the first display 102. In accordance with this example, the first computational device 108 can be a tablet computer, a laptop computer, a smartphone, or any other type of computational device with an integrated display. The system 100 can further include a second computational device 110 that interfaces with the second display 104 to output data via the second display 104, receive an input via the second display 104, etc. Similar to the foregoing description related to the first computational device 108 interfacing with the first display 102, the second computational device 110 can be coupled with or include the second display 104. Alternatively, although not shown, in accordance with various embodiments, it is contemplated that the system 100 need not include the second computational device 110, and accordingly, the first computational device 108 can interface with the second display 104 as well as the first display 102.

Further, the first computational device 108 can interact with the second computational device 110. For instance, the first computational device 108 and the second computational device 110 can interact via wireless and/or wired connections. Interaction between the first computational device 108 and the second computational device 110 can refer to sharing input functionality of display(s) respectively interfaced therewith and/or output functionality of display(s) respectively interfaced therewith (e.g., the first display 102 can be utilized as a peripheral for the second display 104, the first display 102 can provide touch based input functionality while the second display 104 may include or lack such functionality, the first display 102 can extend a desktop of the second display 104, etc.). Additionally or alternatively, interaction between the first computational device 108 and the second computational device 110 can refer to sharing contextual information there between, where the shared contextual information can relate to applications respectively executed by the first computational device 108 and the second computational device 110. Moreover, it is to be appreciated that interaction between the first computational device 108 and the second computational device 110 can refer to other types of resource sharing.

The first computational device 108 can further include a first collaboration component 112, and the second computational device 110 can further include a second collaboration component 114. The first collaboration component 112 and the second collaboration component 114 enable the first computational device 108 and the second computational device 110 to interact. By way of example, the first collaboration component 112 and the second collaboration component 114 can cooperate on a single context for the user 106 across the first computational device 108 and the second computational device 110. In accordance with a further example, the first collaboration component 112 can receive instructions for rendering content on the first display 102 from the second collaboration component 114. According to another illustration, the first collaboration component 112 can send input related data received from the user 106 via the first display 102 to the second collaboration component 114.

Moreover, the system 100 includes a sensor 116 that monitors an environment 118. For instance, the user 106 can be in the environment 118 monitored by the sensor 116. As depicted in FIG. 1, the sensor 116 can be a stand-alone device. However, it is contemplated that the sensor 116 additionally or alternatively can be included in the first display 102, the second display 104, the first computational device 108, and/or the second computational device 110 (e.g., the first computational device 108 can be a tablet computer that includes a camera, the second computational device 110 can be a laptop computer that includes a camera, etc.). According to an example, the sensor 116 can be a camera. By way of further example, the sensor 116 can be a plurality of cameras. Following this example, the plurality of cameras can be pervasive in the environment 118. For instance, outputs from the plurality of cameras can be combined to create a single representation of the environment 118; however, the claimed subject matter is not limited to employing a plurality of cameras or creating a single representation of the environment 118 from outputs of a plurality of cameras. Moreover, it is also to be appreciated that the sensor 116 can include any other type of input device, in addition to or instead of camera(s), that monitors the environment 118 and provides output that can be utilized to detect a visual focus of the user 106.

The system 100 further includes a focus tracking component 120 that detects visual focus information related to the user 106 from the output of the sensor 116. The visual focus information detected by the focus tracking component 120 can be inputted to the first computational device 108 and the second computational device 110. By way of example, the focus tracking component 120 can analyze output from the sensor 116 to detect whether visual focus of the user 106 is on the first display 102 (e.g., represented by dotted line 122) or the second display 104 (e.g., represented by dotted line 124). The visual focus information generated by the focus tracking component 120 can specify a particular display from a set of displays on which the user 106 is visually focused. Thus, for instance, the visual focus information can specify that the user 106 is visually focused on either the first display 102 or on the second display 104 from the set of displays (e.g., the set of displays includes the first display 102 and the second display 104 in the example shown in FIG. 1). According to another example, the visual focus information detected by the focus tracking component 120 can specify that the user 106 is visually focused on or off a particular display. Following this example, the visual focus information inputted to the first computational device 108 can indicate that the user 106 is visually focused on or off the first display 102 (e.g., the user 106 being visually focused off the first display 102 can include when the user 106 is visually focused on the second display 104 as well as when the user 106 is visually focused on neither the first display 102 nor the second display 104).

The focus tracking component 120 can employ substantially any tracking technique on the output from the sensor 116 to generate the visual focus information. Examples of possible tracking techniques that can be utilized by the focus tracking component 120 include eye tracking, head tracking, and movement tracking; however, it is to be appreciated that the claimed subject matter is not limited to the foregoing examples, and other tracking techniques are intended to fall within the scope of the hereto appended claims. Moreover, the focus tracking component 120 can employ information that identifies relative locations of the first display 102 and the second display 104 for detecting the visual focus information.

According to an example, the focus tracking component 120 can employ eye tracking on the output from the sensor 116 to produce the visual focus information (e.g., tracked eye focus of the user 106). Following this example, the focus tracking component 120 can measure eye position and/or eye movement to detect a point of gaze of the user 106 (e.g., where the user 106 is looking). Thus, the focus tracking component 120 can track whether the point of gaze of the user 106 is on a particular display (e.g., on the first display 102, second display 104, etc.) or off the first display 102 as well as the second display 104. Further, the focus tracking component 120 can track a location where the point of gaze of the user 106 is on the particular display, a duration of time that the point of gaze of the user 106 has been at the location, a duration of time that the point of gaze of the user 106 has been on the particular display, and so forth.

The focus tracking component 120 can also compare a duration of time that the visual focus of the user 106 is on a particular display to a minimum threshold duration of time, for example. According to an illustration, the visual focus of the user 106 can shift from the second display 104 to the first display 102, remain on the first display 102 for a duration of time that is less than the minimum threshold duration of time, and then shift from the first display 102 back to the second display 104. Following this illustration, since the duration of time that the visual focus remained on the first display 102 is less than the minimum threshold duration of time, the focus tracking component 120 can inhibit switching the visual focus information to specify that the visual focus of the user 106 changed to being on the first display 102. Alternatively, if the duration of time that the visual focus remained on the first display 102 exceeded the minimum threshold duration of time in the above-noted illustration, then the focus tracking component 120 can output visual focus information that specifies that the visual focus of the user 106 changed to being on the first display 102 and thereafter changed back to being on the second display 104. It is to be appreciated, however, that the claimed subject matter is not limited to the foregoing illustration.

As shown in FIG. 1, the focus tracking component 120 can be separate from the sensor 116; yet, according to another example, the sensor 116 can include the focus tracking component 120. In accordance with another example, the first computational device 108 and/or the second computational device 110 can include the focus tracking component 120. For instance, if the first computational device 108 includes the focus tracking component 120, then the visual focus information generated thereby can be transmitted by the first collaboration component 112 to the second computational device 110 (e.g., the second collaboration component 114) (or vice versa). Moreover, if both the first computational device 108 and the second computational device 110 include the focus tracking component 120, then the first collaboration component 112 and the second collaboration component 114 can cooperate to generate the visual focus information.

The first computational device 108 and the second computational device 110 can receive the visual focus information from the focus tracking component 120, for example; however, it is also contemplated that the second computational device 110 need not receive the visual focus information. Moreover, the first computational device 108 includes a control component 126 that controls the first display 102 based upon the visual focus information received from the focus tracking component 120. The control component 126 can control a type of input that can be receivable from the user 106 via the first display 102 as a function of the visual focus information. Additionally or alternatively, the control component 126 can control content rendered on the first display 102 as a function of the visual focus information. The control component 126 can change the type of input that can be receivable via the first display 102 and/or the content presented via the first display 102 as the visual focus of the user 106 changes. Thus, the control component 126 can alter functionality of the first display 102 based on where the user 106 is gazing.

The following exemplary scenario is presented to illustrate operation of the control component 126. It is to be appreciated, however, that the claimed subject matter is not limited to the below exemplary scenario. According to this scenario, the second computational device 110 can execute a primary application and the first computational device 108 can execute a companion application that complements the primary application executed by the second computational device 110. When the control component 126 receives visual focus information that specifies that the user 106 is visually focused on the first display 102 (e.g., represented by dotted line 122), then the first display 102 can be optimized for the companion application. Alternatively, when the control component 126 receives visual focus information that specifies that the user 106 is visually focused on the second display 104 (or off the display 102, on a disparate display (not shown), etc.), then the first display 102 can be optimized for the primary application. Further, the control component 126 can cause the first display 102 to transition between being optimized for the companion application and the primary application as the visual focus information is varied.

Below is an illustration of the foregoing exemplary scenario. For instance, a television program can be rendered on the second display 104 by the second computational device 110 executing the primary application, and the companion application executed by the first computational device 108 can relate to a program guide. Accordingly, when the control component 126 receives visual focus information that specifies that the user 106 is visually focused on the first display 102 (e.g., represented by the dotted line 122), then the first display 102 can be optimized for the program guide (e.g., the first display 102 can render content related to the program guide, the first display 102 can be configured to receive input related to the program guide, etc.). By way of example, the first display 102 can render rich metadata about the television program being rendered on the second display 104, the type of input receivable from the user 106 can permit detailed manipulation of the program guide (e.g., selecting a particular channel rendered on the first display 102), and so forth. Moreover, when the control component 126 receives visual focus information that specifies that the user 106 is visually focused on the second display 104 (e.g., represented by the dotted line 124), then the first display 102 can be optimized for the television program (e.g., the first display 102 can be configured to receive input related to watching the television program on the second display 104). For example, the type of input receivable from the user 106 via the first display 102 can be gross gestures that can cause a channel to be changed, a volume level to be adjusted, or the like.

Moreover, context-sensitive content can be rendered on the first display 102. For instance, the first collaboration component 112 can receive contextual information related to the second display 104 (or the second computational device 110) from the second collaboration component 114. The contextual information can pertain to where the user 106 was last interacting; however, the claimed subject matter is not so limited. The first collaboration component 112 (and/or the control component 126) can identify the content to be rendered on the first display 102 as a function of the contextual information related to the second display 104 when the visual focus information received thereby specifies that the user 106 is visually focused on the first display 102. Further, the control component 126 can render the content identified as a function of the contextual information on the first display 102 when the visual focus information specifies that the user is visually focused on the first display 102.

Pursuant to a further example, the second computational device 110 can lack a control component similar to the control component 126 as depicted in FIG. 1. According to an illustration, the first display 102 can be a touch enabled display of a tablet computer (e.g., the first computational device 108) and the second display 104 can be an external display of a desktop computer (e.g., the second computational device 110). Following this illustration, it is contemplated that functionality of the touch enabled display can be varied by the control component 126 as a function of the visual focus information, while functionality of the external display can remain static regardless of the visual focus information. Yet, the claimed subject matter is not limited to the above-noted illustration.

According to another example, although not shown, it is contemplated that the second computational device 110 can include a control component similar to the control component 126 of the first computational device 108. Such control component of the second computational device 110 can control the second display 104 based upon the visual focus information received from the focus tracking component 120. Accordingly, similar to the control of the first display 102 by the control component 126, a type of input that can be receivable from the user 106 via the second display 104 and/or the content rendered on the second display 104 can be controlled by a control component of the second computational device 110. By way of another illustration, both the first display 102 and the second display 104 can be touch enabled displays of respective tablet computers (e.g., the first computational device 108 and the second computational device 110). Pursuant to this illustration, the functionality of the first display 102 and the second display 104 can be varied respectively by the control component 126 and the control component (not shown) of the second computational device 110 based on the visual focus information. Again, it is noted that the claimed subject matter is not limited to the foregoing illustration.

Although FIG. 1 depicts that the system 100 includes two computational devices (e.g., the first computational device 108 and the second computational device 110) respectively interfaced with two displays (e.g., the first display 102 and the second display 104), where the two computational devices interact with each other, it is to be appreciated that the system 100 can include more than two displays and/or one or more computational devices (e.g., the system 100 can need not include the second computational device 110). By way of example (not shown), the system 100 can include a third display and a third computational device. Following this example, the third computational device can interface with the third display. Moreover, the third computational device can interact with the first computational device 108 and the second computational device 110. Pursuant to yet another example (not shown), the system 100 additionally or alternatively can include a fourth display. According to this example, either the first computational device 108 or the second computational device 110 can interface with the fourth display; thus, more than two displays can be driven by a shared computational device. By way of illustration pursuant to this example, the first computational device 108 can interface with the first display 102 and the fourth display. Thus, the control component 126 can control the first display 102 and the fourth display based on the visual focus information received from the focus tracking component 120.

Figure 2:
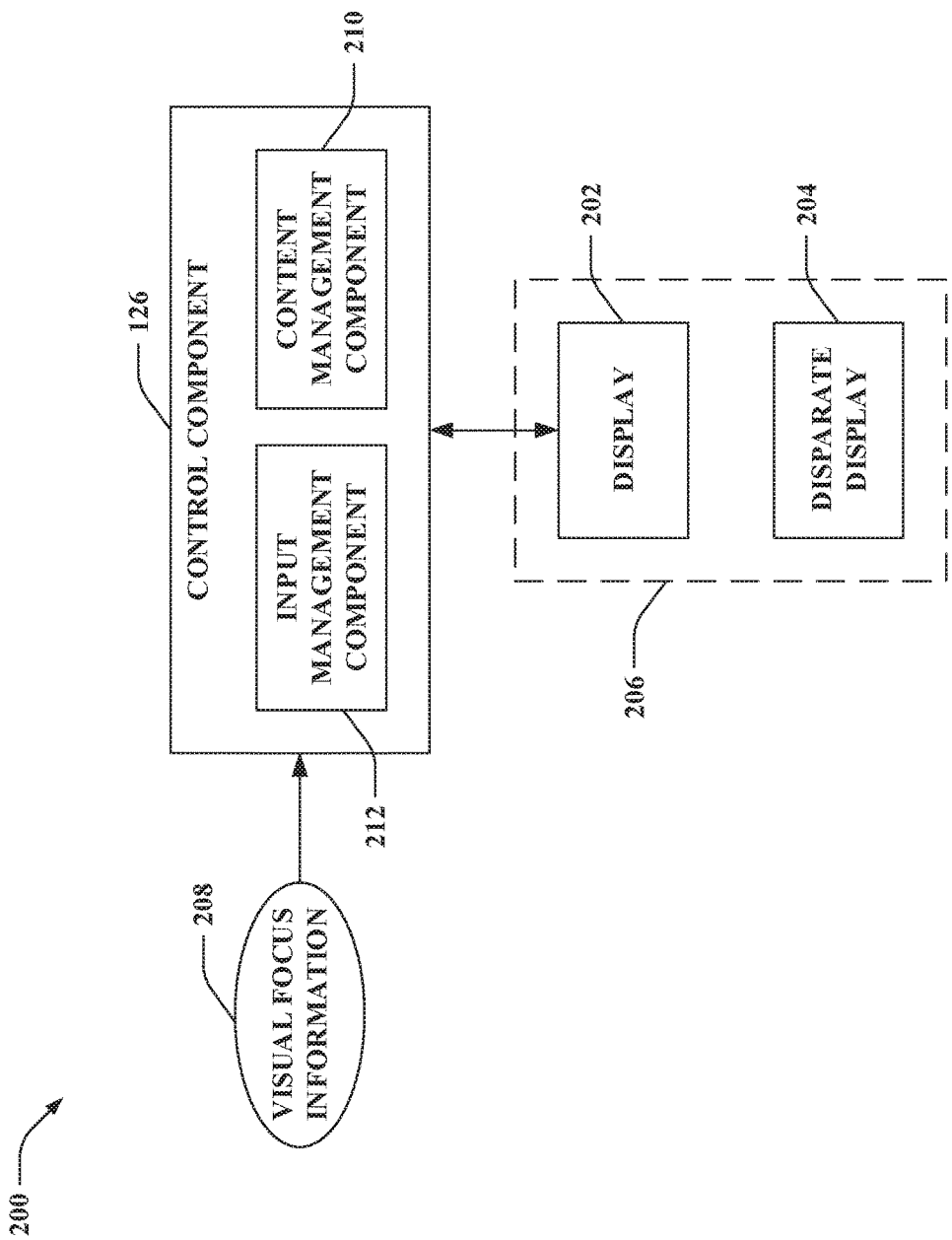
FIG. 2 illustrates a functional block diagram of an exemplary system that controls content rendered and/or a type of input receivable via a display based on the visual focus of a user.

With reference to FIG. 2, illustrated is a system 200 that controls content rendered and/or a type of input receivable via a display 202 based on the visual focus of a user. The system 200 includes a display 202 and a disparate display 204 (e.g., the first display 102 and the second display 104 of FIG. 1), which are included in a set of displays 206. According to an example, the display 202 and the disparate display 204 can interface with disparate computational devices (e.g., the first computational device 108 and the second computational device 110 of FIG. 1, respectively), where the disparate computational devices interact with each other. Pursuant to another example, the display 202 and the disparate display 204 can interface with a shared computational device (e.g., the first computational device 108 of FIG. 1 can interface with both the display 202 and the disparate display 204).

Moreover, the system 200 includes the control component 126, which receives visual focus information 208 (e.g., from the focus tracking component 120 of FIG. 1). The visual focus information 208 can specify a particular display from the set of displays 206 on which a user (e.g., the user 106 of FIG. 1) is visually focused. The control component 126 controls the display 202 based upon the visual focus information 208. Moreover, the control component 126 can also control the disparate display 204 if the display 202 and the disparate display 204 interface with a shared computational device. Although not shown, it is to be appreciated that a computational device (e.g., the first computational device 108 of FIG. 1) can include the control component 126; however, the claimed subject matter is not so limited.

The control component 126 can further include a content management component 210 and an input management component 212. The content management component 210 controls content rendered on display 202 as a function of the visual focus information 208. Further, the input management component 212 controls a type of input receivable from the user via the display 202 as a function of the visual focus information 208. Moreover, the content management component 210 and the input management component 212 can similarly control the content rendered on the disparate display 204 and the type of input receivable from the user via the disparate display 204 as a function of the visual focus information 208 if the display 202 and disparate display 204 interface with a shared computational device.

According to an example, the content management component 210 can control the display 202 to selectively render or inhibit rendering of the content based on the visual focus information 208. Following this example, the content management component 210 can render the content on the display 202 when the visual focus information 208 specifies that the user is visually focused on the display 202. Alternatively, the content management component 210 can inhibit rendering of the content on the display 202 when the visual focus information 208 specifies that the particular display from the set of displays 206 on which the user is visually focused differs from the display 202 (e.g., the visual focus information 208 specifies that the user is visually focused on the disparate display 204 or a different display (not shown) in the set of displays 206).

By way of another example, the content management component 210 can control the display 202 by selecting a granularity of the content rendered on the display 202 as a function of the visual focus information 208. Further, the content management component 210 can render the content on the display 202 with the selected granularity. For instance, the granularity of the content rendered on the display 202 can be more detailed when the visual focus information 208 specifies that the user is visually focused on the display 202. Moreover, the granularity of the content rendered on the display 202 can be less detailed when the visual focus information 208 specifies that the particular display from the set of displays 206 on which the user is visually focused differs from the display 202 (e.g., the visual focus information 208 specifies that the user is visually focused on the disparate display 204 or a different display (not shown) in the set of displays 206). According to an illustration, the less detailed content can be utilized to convey information or capture the visual focus of the user when the display 202 is in the peripheral vision of the user (e.g., a part of the vision that occurs outside the center of gaze).

Moreover, the content management component 210 can render content on the display 202 that relates to content rendered on the disparate display 204 when the visual focus information 208 specifies that the user is visually focused on the display 202. For instance, the content rendered on the display 202 by the content management component 210 can be the content rendered on the disparate display 204, a differing view of the content rendered on the disparate display 204, metadata related to the content rendered on the disparate display 204, a property grid that relates to the content rendered on the disparate display 204 (e.g., where a property in the property grid can be altered via input to the display 202, etc.), and so forth. According to an illustration, a video can be rendered on the disparate display 204 when the visual focus information 208 specifies that the user is visually focused on the disparate display 204 (e.g., gross gestures can be inputted to the display 202 to stop, start, skip backwards, skip forwards, etc.). Following this illustration, when the visual focus information 208 specifies that the user is visually focused on the display 202, the content management component 210 can render specific frames of the video stream, slices of the video stream, or the like on the display 202.

Further, the input management component 212 can configure the display 202 to receive various types of input as a function of the visual focus information 208. By way of illustration, as configured by the input management component 212, the type of input receivable from the user via the display 202 can relate to the display 202 when the visual focus information 208 specifies that the user is visually focused on the display 202. Alternatively, as configured by the input management component 212, the type of input receivable from the user via the display 202 can relate to the disparate display 204 when the visual focus information 208 specifies that the user is visually focused on the disparate display 204.

Moreover, the input management component 212 can configure the display 202 to receive different sets of input types based on the visual focus information 208. By way of illustration, a slideshow can be rendered on the disparate display 204. When the visual focus information 208 specifies that the user is visually focused on the disparate display 204, the input management component 212 can configure the display 202 to receive input related to moving the slideshow rendered on the disparate display 204 forwards or backwards one slide. Further, when the visual focus information 208 specifies that the user is visually focused on the display 202, the input management component 212 can configure the display 202 to receive input related to a larger set of types of inputs (e.g., move forwards or backwards one slide, select a slide from the slideshow to jump to, manipulate a slide carousel rendered on the display 202, navigate notes rendered on the display 202, etc.). It is to be appreciated, however, that the claimed subject matter is not limited to the foregoing example.

FIGS. 3-6 illustrate an exemplary scenario showing employment of a system 300 that controls display functionality based on visual focus in an environment that includes multiple displays. As depicted in the exemplary scenario, the system 300 includes a touch enabled display 302 (e.g., the first display 102 of FIG. 1, the display 202 of FIG. 2, etc.), a display 304 (e.g., the second display 104 of FIG. 1, the disparate display 204 of FIG. 2, etc.), and a sensor 306 (e.g., the sensor 116 of FIG. 1). According to an example, the touch enabled display 302 can be included in a tablet computer, smartphone, or the like, and the display 304 can be an external display of a desktop computer. By way of another example, the touch enabled display 302 and the display 304 can interface with a shared computational device. The exemplary scenario shows the functionality of the touch enabled display 302 varying as a function of a visual focus of a user 308. As illustrated in FIGS. 3-6, the touch enabled display 302 can switch between being a dedicated input device for the display 304 when the user 308 is visually focused on the display 304 and being an input device and output device that renders content when the user 308 is visually focused on the touch enabled display 302. It is to be appreciated that the exemplary scenario of FIGS. 3-6 is provided for illustration purposes, and it is not intended to limit the scope of the hereto appended claims.

Figure 3:
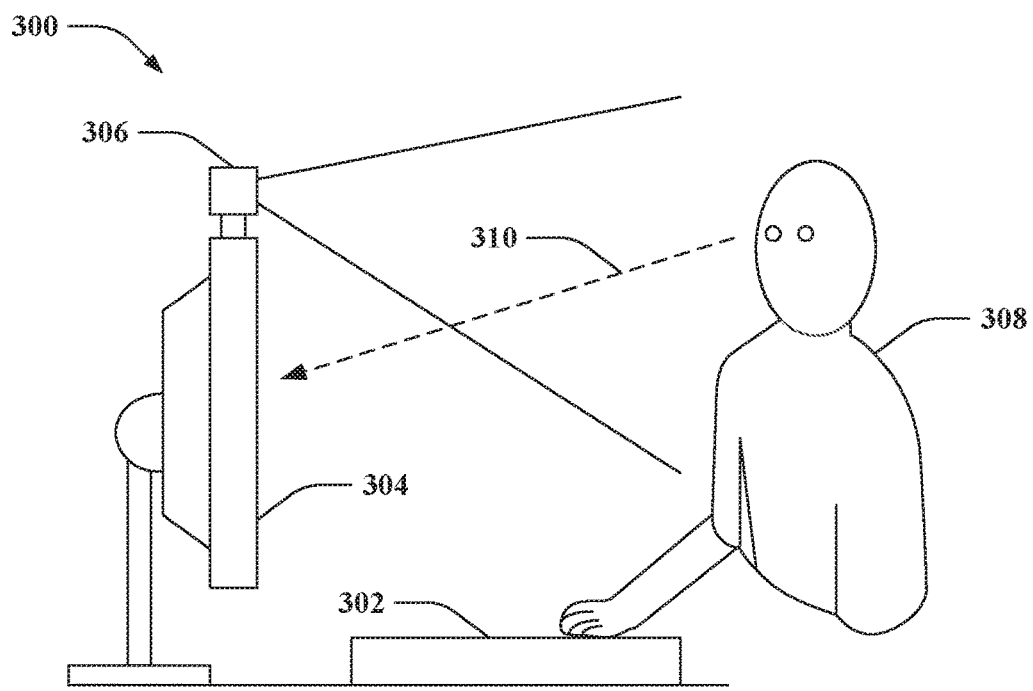
FIGS. 3-6 illustrate an exemplary scenario showing employment of a system that controls display functionality based on visual focus in an environment that includes multiple displays.
Figure 4:
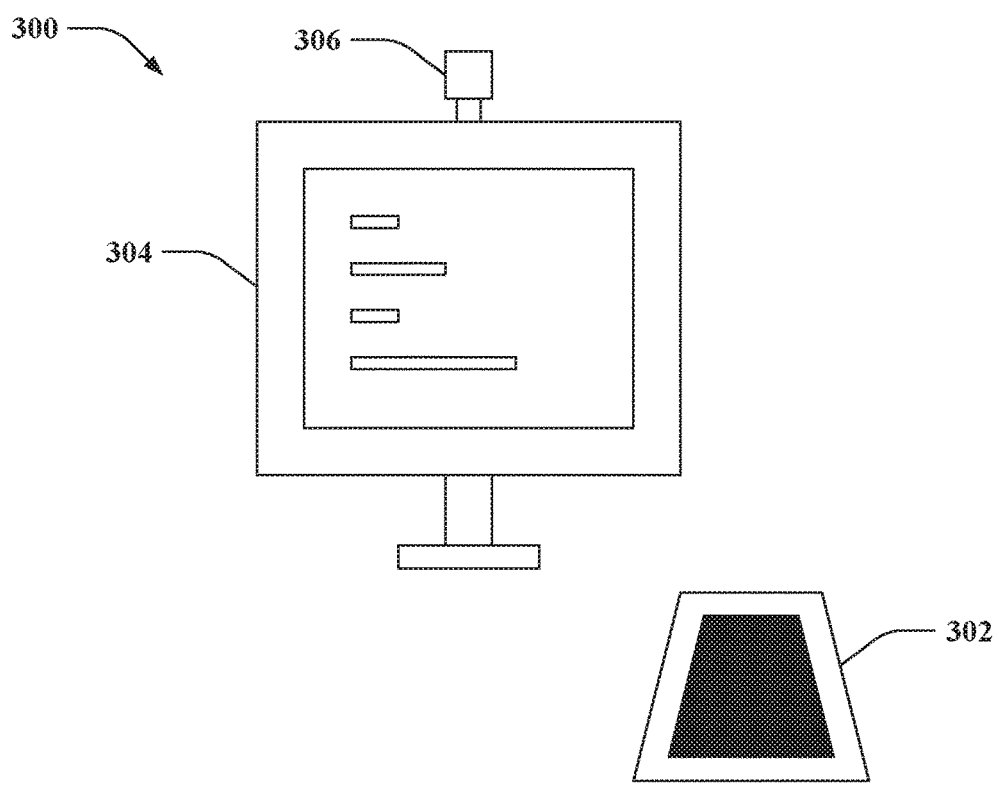

As shown in FIG. 3, the user 308 is visually focused on the display 304 (e.g., represented by the dotted line 310), which can be detected based on output from the sensor 306. While the visual focus of the user 308 is on the display 304, the user 308 is shown to employ the touch enabled display 302. FIG. 4 shows another perspective of the system 300 illustrated in FIG. 3. When the user 308 is detected to be visually focused on the display 304 (e.g., on content rendered on the display 304), the touch enabled display 302 is a dedicated input device. For instance, the touch enabled display 302 can receive touch based input from the user 308, which can be utilized for manipulation, navigation, etc. of the content rendered on the display 304, when the user 308 is detected to be visually focused on the display 304. As illustrated, content is inhibited from being rendered on the touch enabled display 302 when visual focus of the user 308 is detected as being on the display 304. According to another example (not shown), content can be rendered on the touch enabled display 302 when visual focus of the user 308 is detected to be on the display 304; however, the content rendered on the touch enabled display 302 when the visual focus of the user 308 is detected as being on the display 304 can differ from the content rendered on the touch enabled display 302 when the visual focus of the user 308 is detected to be on the touch enabled display 302.

Figure 5:
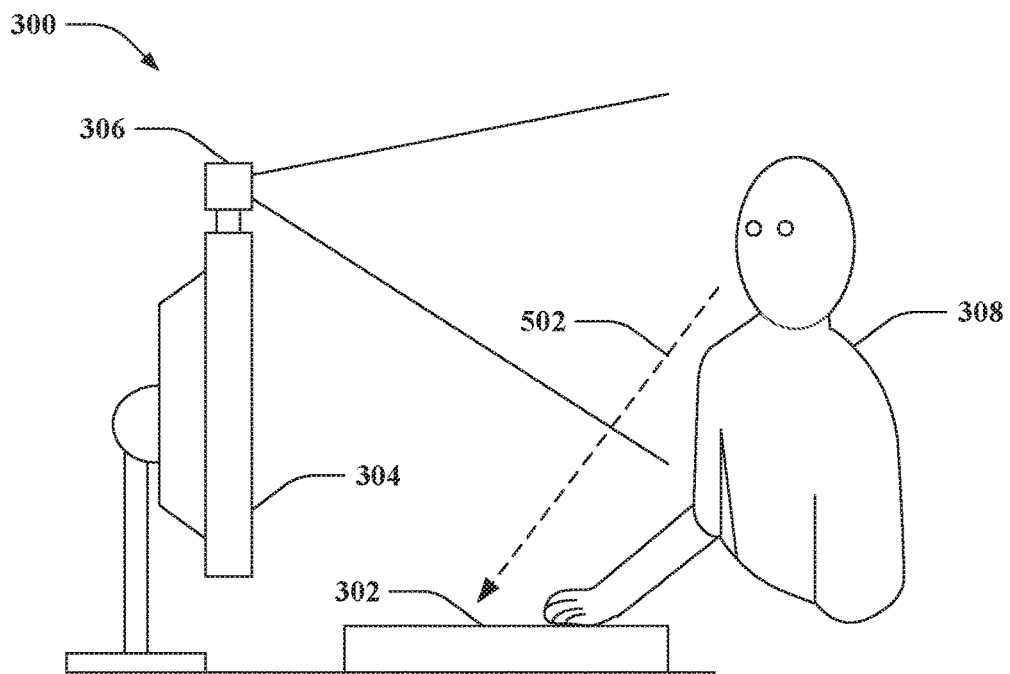
Figure 6:
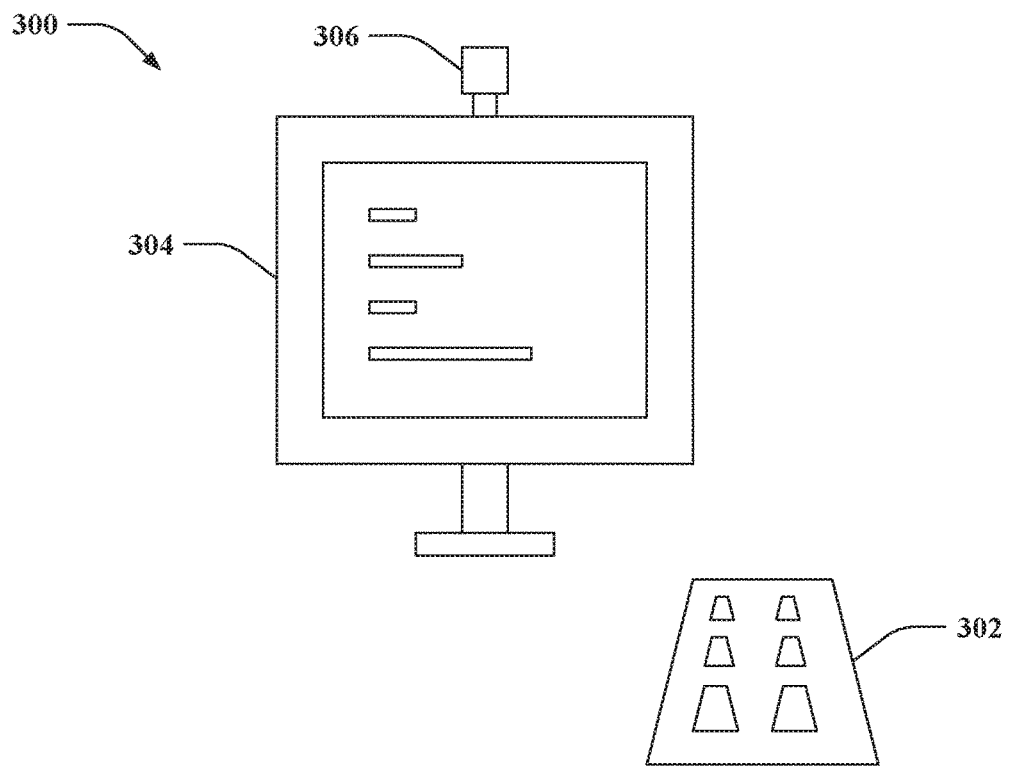

Now referring to FIG. 5, the user 308 is visually focused on the touch enabled display 302 (e.g., represented by the dotted line 502), which can be detected based on output from the sensor 306. The user 308 is depicted as utilizing the touch enabled display 302 while visually focusing on the touch enabled display 302. FIG. 6 shows another perspective of the system 300 illustrated in FIG. 5. When the user 308 is detected to be visually focused on the touch enabled display 302, the touch enabled display 302 renders content. Further, when the user 308 is detected as being visually focused on the touch enabled display 302, the touch enabled display 302 can receive touch based input from the user 308, which can be employed for manipulation, navigation, etc. of the content rendered on the touch enabled display 302.

According to an example, the user 308 can be visually focused on the display 304 as shown in FIGS. 3 and 4. While the visual focus of the user 308 is on the display 304, content is rendered on the display 304 and the touch enabled display 302 can be utilized by the user 308 to manipulate the content rendered on the display 304. If the user 308 alters her visual focus to the touch enabled display 302, as shown in FIGS. 5 and 6, then the touch enabled display 302 can render content that relates to a property of the content rendered on the display 304. Further, the property of the content rendered on the display 304 can be manipulated based on input received via the touch enabled display 302 while the visual focus of the user 308 remains on the touch enabled display 302. Thereafter, the user 308 can return her visual focus to the display 304 as depicted in FIGS. 3 and 4, and a manifestation of the property as manipulated can be displayed on the display 304.

Figure 7:
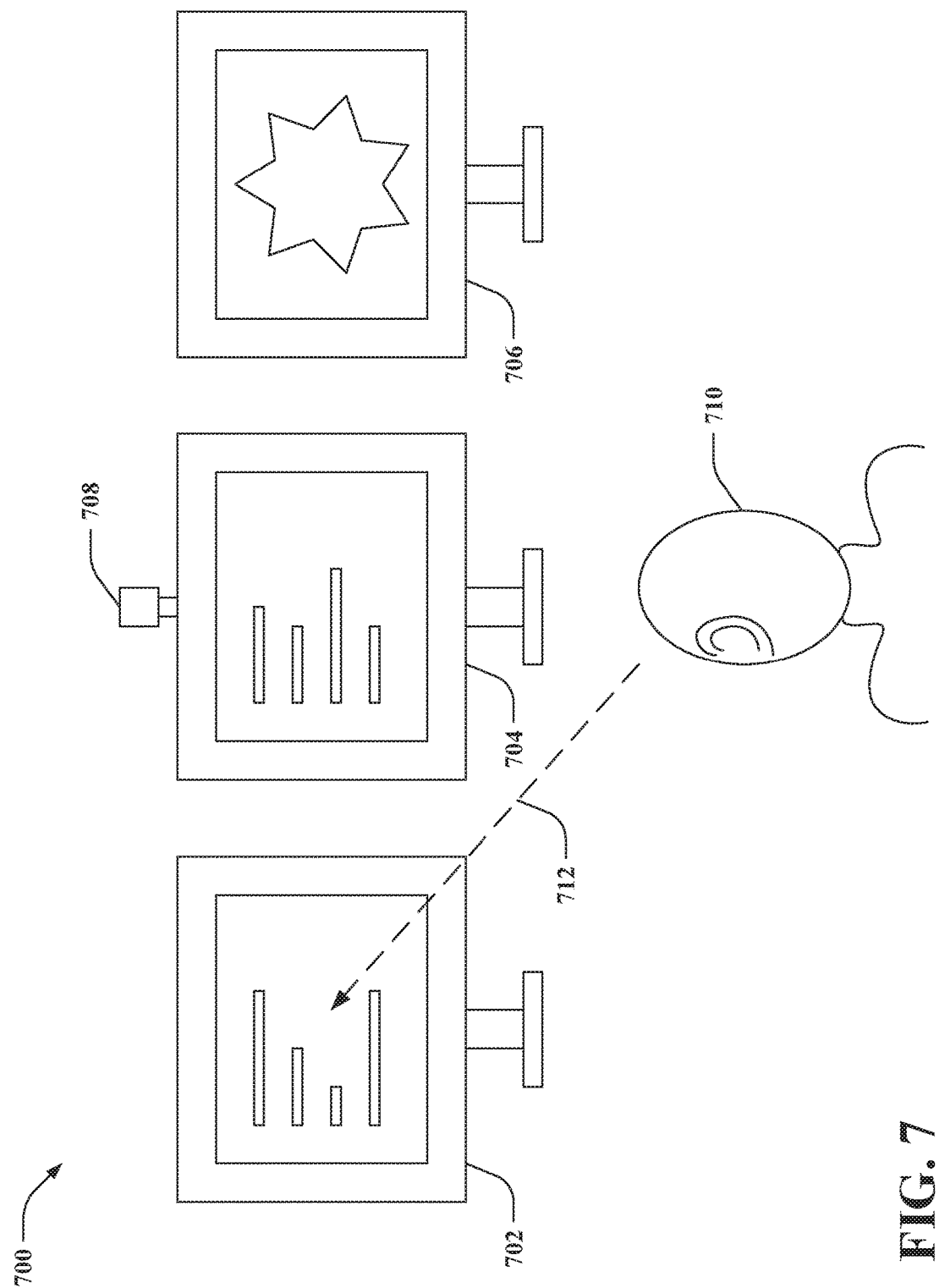
FIGS. 7-8 illustrate an exemplary scenario showing utilization of a system that controls content rendered on a display based on visual focus in an environment that includes multiple displays.
Figure 8:
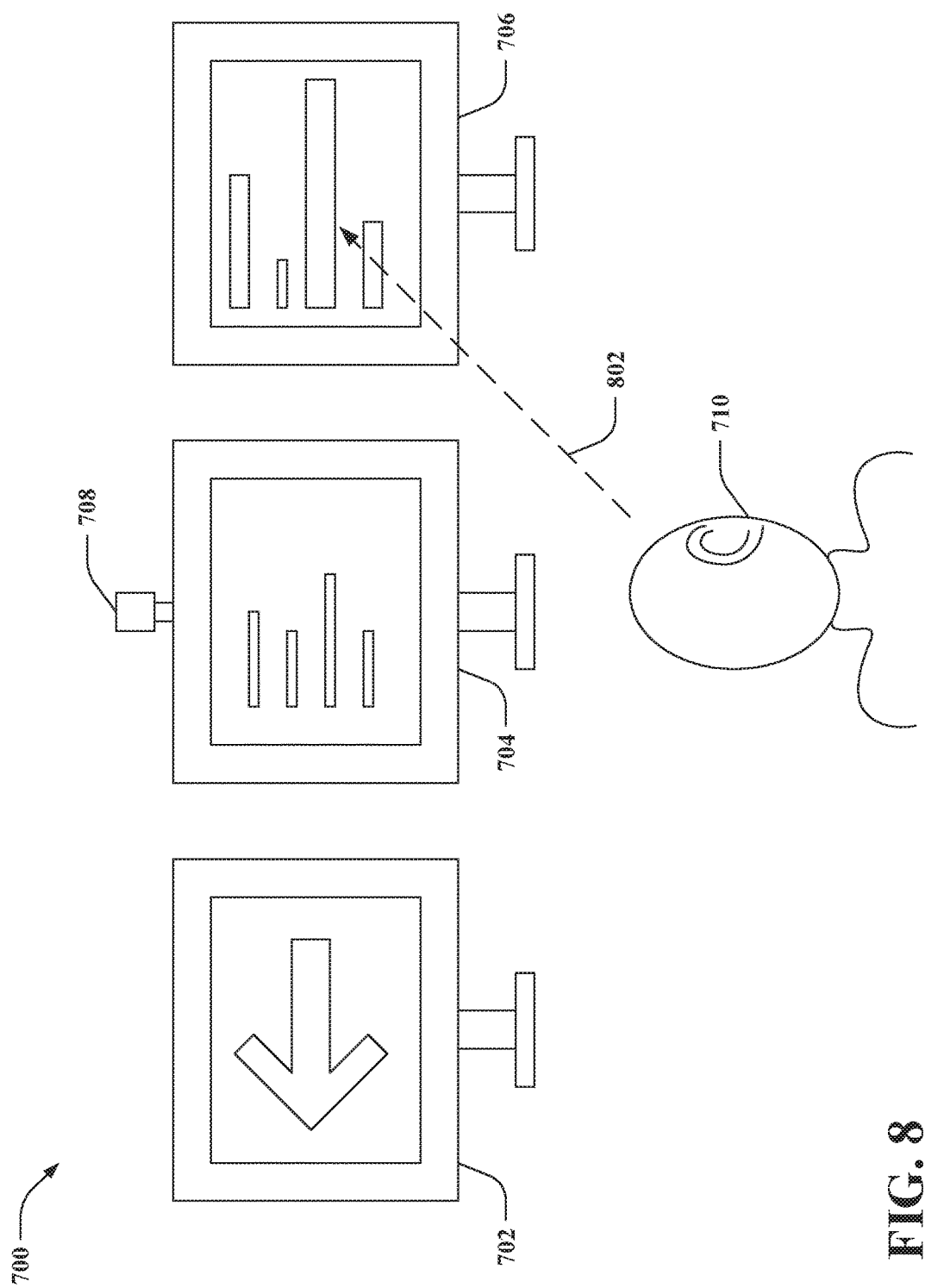

FIGS. 7-8 illustrate an exemplary scenario showing utilization of a system 700 that controls content rendered on a display based on visual focus in an environment that includes multiple displays. The exemplary scenario shows that the system 700 includes a display 702, a display 704, and a display 706 (e.g., collectively referred to as the displays 702-706). According to an example, different computational devices can respectively interface with the display 702, the display 704, and the display 706 (e.g., computational device A can interface with the display 702, computational device B can interface with the display 704, and computational device C can interface with the display 706), and the computational devices can interact with each other. By way of another example, a computational device A can interface with two of the displays 702-706 and a computational device B can interface with the remaining one of the displays 702-706, where the computational device A and the computational device B interact. The exemplary scenario depicts the content rendered on the display 702 and the display 706 varying as a function of a visual focus of a user 710. Although not shown, it is contemplated that the content rendered on the display 704 can similarly vary based on the visual focus of the user 710. It is to be appreciated, however, that the exemplary scenario of FIGS. 7-8 is provided for illustration purposes, and the claimed subject matter is not so limited.

As shown in FIG. 7, the user 710 is visually focused on the display 702 (e.g., as represented by the dotted line 712), which can be detected based on output from the sensor 708. Moreover, in FIG. 8, the user 710 is visually focused on the display 706 (e.g., as represented by the dotted line 802), which can be detected based on output from the sensor 708. FIGS. 7 and 8 depict content rendered by the display 702 and the display 706 changing as a function of the visual focus of the user 710. More particularly, the content rendered on the display 702 can be more detailed when the visual focus of the user 710 is on the display 702 (e.g., shown in FIG. 7) as compared to when the visual focus of the user 710 is on the display 706 (e.g., shown in FIG. 8). Similarly, the content rendered on the display 706 can be more detailed when the visual focus of the user 710 is on the display 706 (e.g., shown in FIG. 8) as compared to when the visual focus of the user 710 is on the display 702 (e.g., shown in FIG. 7).

According to an example, content rendered on a display can become less detailed as the visual focus of the user 710 moves away from the display. Similarly, content rendered on a display can become more detailed (e.g., condensed, etc.) as the visual focus of the user 710 moves towards the display. Further, the less detailed content can be employed to convey information or capture the visual focus of the user when a display is in the peripheral vision of the user 710. By way of another example, the less detailed content rendered on a display located in the peripheral vision of the user 710 can be a color presented on the display; however, the claimed subject matter is not so limited.

Figure 9:
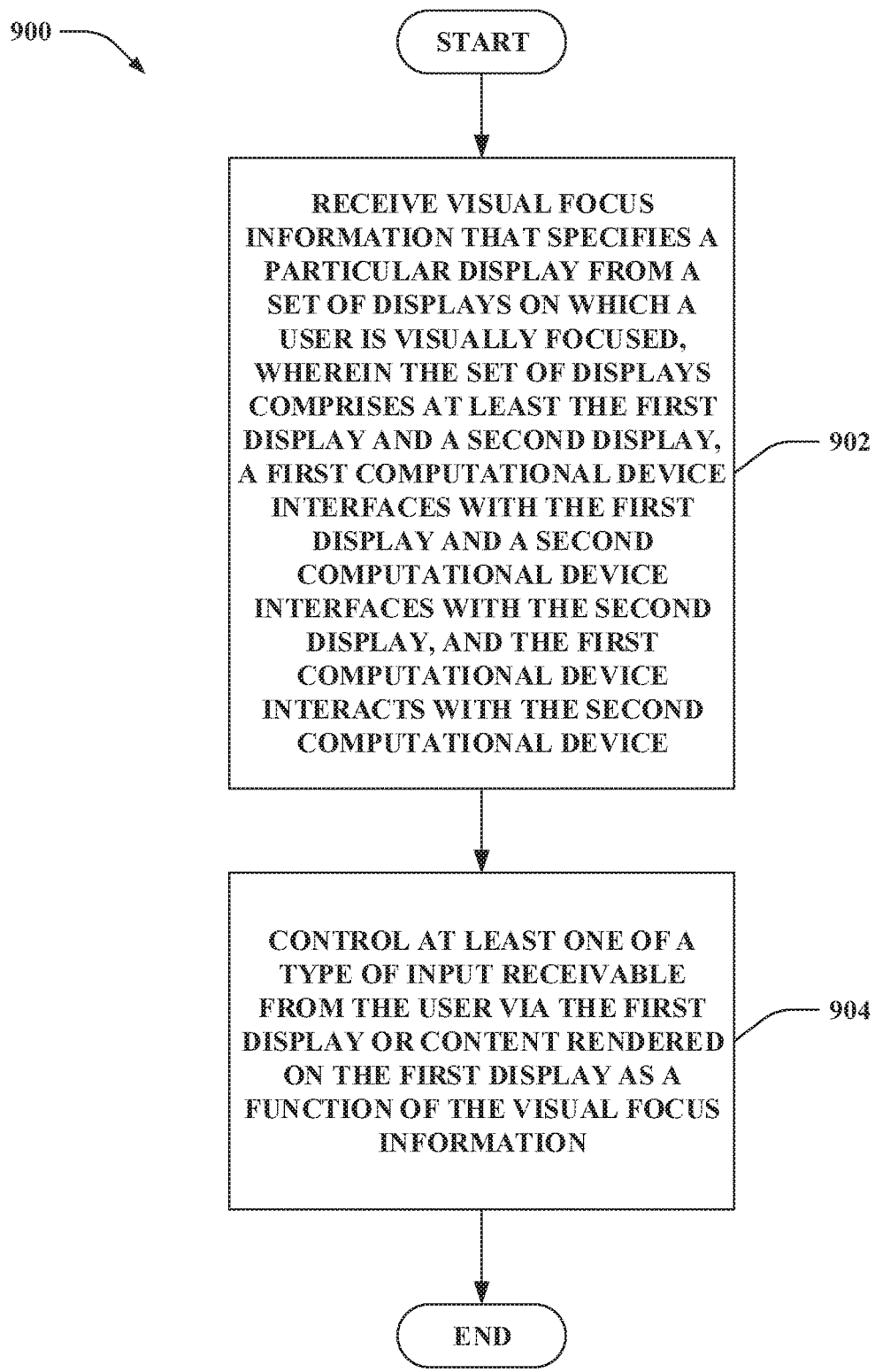
FIG. 9 is a flow diagram that illustrates an exemplary methodology for controlling functionality of a first display.
Figure 10:
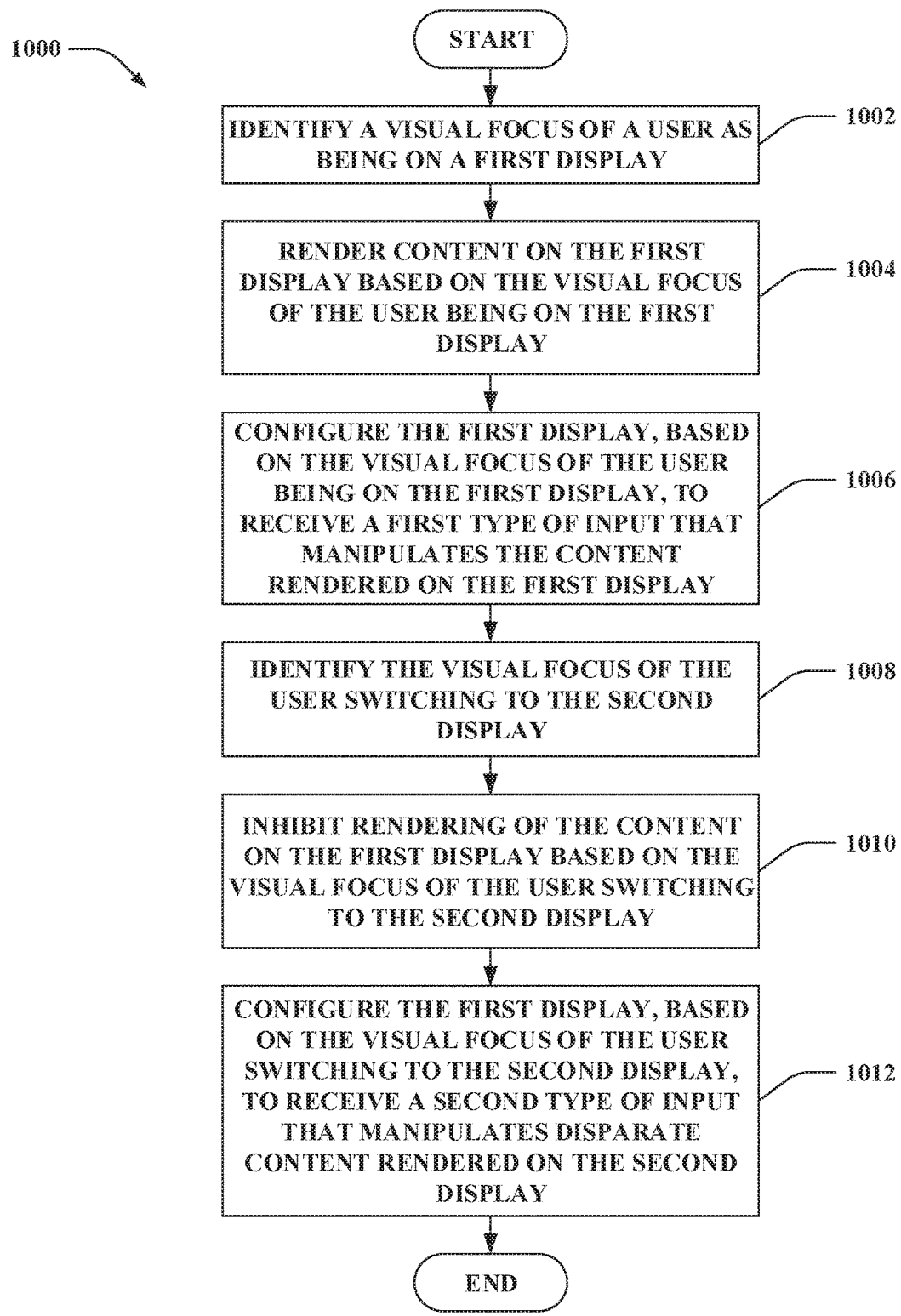
FIG. 10 is a flow diagram that illustrates an exemplary methodology for controlling a touch enabled display in an environment that includes multiple displays.

FIGS. 9-10 illustrate exemplary methodologies relating to visual focus-based control of coupled displays. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 9 illustrates a methodology 900 for controlling functionality of a first display. At 902, visual focus information that specifies a particular display from a set of displays on which a user is visually focused can be received. The set of displays can comprise at least the first display and a second display. Further, a first computational device can interface with the first display and a second computational device can interface with the second display. Moreover, the first computational device can interact with the second computational device. According to an example, the visual focus information that specifies the particular display from the set of displays on which the user is visually focused can be detected from an output of a sensor. By way of illustration, the visual focus information can be detected by performing eye tracking, head tracking, movement tracking, or the like on the output of the sensor.

At 902, at least one of a type of input receivable from the user via the first display or content rendered on the first display can be controlled as a function of the visual focus information. By way of example, the content can be rendered on the first display when the visual focus information specifies that the user is visually focused on the first display, and rendering of the content can be inhibited on the first display when the visual focus information specifies that the particular display from the set of displays on which the user is visually focused differs from the first display. Pursuant to another example, a granularity of the content rendered on the first display can be selected as a function of the visual focus information, and the content can be rendered on the first display with the selected granularity. Following this example, the granularity of the content can be more detailed when the visual focus information specifies that the user is visually focused on the first display and less detailed when the visual focus information specifies that the particular display from the set of displays on which the user is visually focused differs from the first display. In accordance with yet another example, the type of input receivable from the user via the first display can relate to the first display when the visual focus information specifies that the user is visually focused on the first display and the type of input receivable from the user via the first display can relate to the second display when the visual focus information specifies that the user is visually focused on the second display.

Pursuant to a further example, contextual information related to the second display can be received. Moreover, the content to be rendered on the first display can be identified as a function of the contextual information related to the second display when the visual focus information specifies that the user is visually focused on the first display. Further, the content identified as a function of the contextual information can be rendered on the first display when the visual focus information specifies that the user is visually focused on the first display.

According to an example, it is contemplated that the set of displays can further comprise at least a third display. Following this example, a third computational device can interface with the third display. Moreover, the third computational device can interact with the first computational device and the second computational device.

By way of yet another example, it is to be appreciated that the set of displays can further comprise at least a fourth display. Pursuant to this example, the first computational device or the second computational device can interface with the fourth display.

It is also contemplated that the first computational device can execute a companion application that complements a primary application executed by the second computational device. Further, the first display can be optimized for the companion application when the visual focus information specifies that the user is visually focused on the first display. Moreover, the first display can be optimized for the primary application when the visual focus information specifies that the particular display from the set of displays on which the user is visually focused differs from the first display.

In accordance with another example, the first display can be switched between being a dedicated input device and being an input device and an output device that renders content. For instance, the first display can be the dedicated input device for the second display when the visual focus information specifies that the user is visually focused on the second display and can be the input device and the output device that renders the content when the visual focus information specifies that the user is visually focused on the first display. Further, the first display can be a touch enabled display.

Pursuant to another example, the content can be rendered on the first display when the visual focus information specifies that the user is visually focused on the first display. Following this example, the content rendered on the first display can relate to a property of disparate content rendered on the second display. Moreover, the property of the disparate content rendered on the second display can be manipulated based on the input received via the first display when the visual focus information specifies that the user is visually focused on the first display. Accordingly, a manifestation of the property of the disparate content as manipulated can be displayed on the second display when the visual focus information specifies that the user is visually focused on the second display.

With reference to FIG. 10, illustrated is a methodology 1000 for controlling a touch enabled display in an environment that includes multiple displays. At 1002, a visual focus of a user can be identified as being on a first display. For instance, the first display can be a touch enabled display. Further, a first computational device can interface with the first display and a second computational device can interface with the second display. Moreover, the first computational device can interact with the second computational device. Pursuant to an example, the visual focus of the user can be identified as being on the first display from received visual focus information that specifies the visual focus of the user. According to another example, the visual focus of the user can be identified as being on the first display by analyzing output from a sensor to detect the visual focus of the user.

At 1004, content can be rendered on the first display based on the visual focus of the user being on the first display. At 1006, the first display can be configured, based on the visual focus of the user being on the first display, to receive a first type of input that manipulates the content rendered on the first display. At 1008, switching of the visual focus of the user to the second display can be identified. At 1010, rendering of the content on the first display can be inhibited based on the visual focus of the user switching to the second display. At 1012, the first display can be configured, based on the visual focus of the user switching to the second display, to receive a second type of input that manipulates disparate content rendered on the second display.

According to an example, the visual focus of the user can be identified to return to the first display. Following this example, the content can be rendered on the first display based on the visual focus of the user returning to the first display. Moreover, the first display can be configured, based on the visual focus of the user returning to the first display, to receive the first type of input that manipulates the content rendered on the first display.

Figure 11:
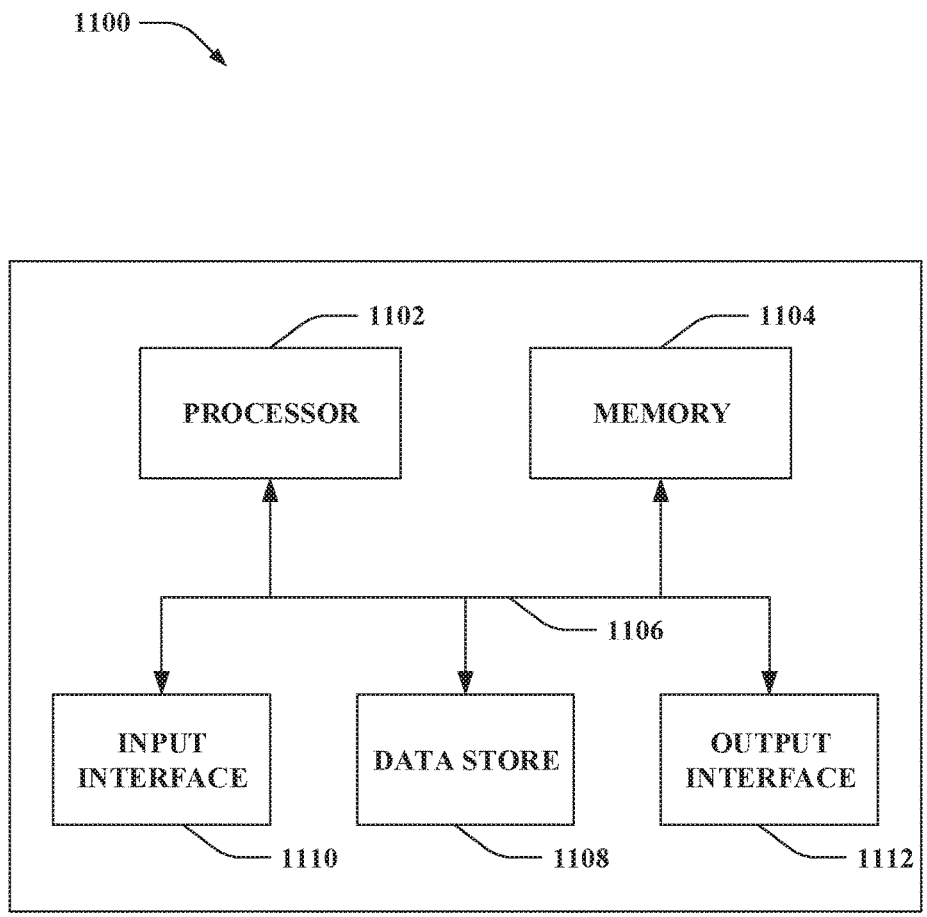
FIG. 11 illustrates an exemplary computing device.

Referring now to FIG. 11, a high-level illustration of an exemplary computing device 1100 that can be used in accordance with the systems and methodologies disclosed herein is illustrated. For instance, the computing device 1100 may be used in a system that controls a type of input receivable from a user via a display based upon visual focus of the user. By way of another example, the computing device 1100 can be used in a system that controls content rendered on a display based upon the visual focus of the user. The computing device 1100 includes at least one processor 1102 that executes instructions that are stored in a memory 1104. The instructions may be, for instance, instructions for implementing functionality described as being carried out by one or more components discussed above or instructions for implementing one or more of the methods described above. The processor 1102 may access the memory 1104 by way of a system bus 1106. In addition to storing executable instructions, the memory 1104 may also store visual focus information of a user, content to be rendered on a display, information that identifies relative locations of displays, and so forth.

The computing device 1100 additionally includes a data store 1108 that is accessible by the processor 1102 by way of the system bus 1106. The data store 1108 may include executable instructions, visual focus information of a user, content to be rendered on a display, information that identifies relative locations of displays, etc. The computing device 1100 also includes an input interface 1110 that allows external devices to communicate with the computing device 1100. For instance, the input interface 1110 may be used to receive instructions from an external computer device, from a user, etc. The computing device 1100 also includes an output interface 1112 that interfaces the computing device 1100 with one or more external devices. For example, the computing device 1100 may display text, images, etc. by way of the output interface 1112.

Additionally, while illustrated as a single system, it is to be understood that the computing device 1100 may be a distributed system. Thus, for instance, several devices may be in communication by way of a network connection and may collectively perform tasks described as being performed by the computing device 1100.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method of controlling functionality of a first display of a first computational device, comprising:
   receiving visual focus information that specifies a particular display from a set of displays in an environment on which a user is visually focused, wherein the environment comprises at least the first display of the first computational device and a second display of a second computational device viewable by the user;
   displaying, on the first display, an indication of a property of content displayed on the second display when the visual focus information specifies that the user is visually focused on the first display; and
   manipulating the property of the content displayed on the second display, the property being manipulated based on input from the user received via the first display when the visual focus information specifies that the user is visually focused on the first display, wherein a manifestation of the property of the content as manipulated is displayed on the second display responsive to the visual focus information specifying that the user is visually focused on the second display.

2. The method of claim 1, further comprising:
receiving contextual information, the contextual information specifies that the user was last interacting with the content on the second display prior to the visual focus of the user switching from the second display;
wherein the indication of the property of the content is selectively displayed on the first display as a function of the contextual information when the visual focus information specifies that the user is visually focused on the first display.

3. The method of claim 2, the contextual information being based on a location of a point of gaze of the user on the second display prior to the visual focus of the user switching from the second display.

4. The method of claim 1, wherein a granularity of content displayed on the first display changes as a function of the visual focus information, the granularity of the content on the first display being more detailed when the visual focus information specifies that the user is visually focused on the first display and less detailed when the visual focus information specifies that the user is visually focused off of the first display.

5. The method of claim 1, further comprising:
displaying, on the first display, metadata about the content displayed on the second display when the visual focus information specifies that the user is visually focused on the first display.

6. The method of claim 1, further comprising:
displaying, on the first display, a differing view of the content displayed on the second display when the visual focus information specifies that the user is visually focused on the first display.

7. The method of claim 1, further comprising:
controlling the first display to be a peripheral touch-enabled input device for the second computational device when the visual focus information specifies that the user is visually focused on the second display.

8. The method of claim 1, further comprising:
detecting the visual focus information.

9. The method of claim 8, wherein the visual focus information is detected using at least one of eye tracking, head tracking, or movement tracking.

10. A computational device, comprising:
an integrated touch enabled display;
at least one processor; and
memory that comprises computer-executable instructions that, when executed by the at least one processor, cause the at least one processor to perform acts including:
displaying, on the integrated touch enabled display, an indication of a property of content displayed on a disparate display when visual focus information specifies that a user is visually focused on the integrated touch enabled display, the visual focus information specifies a visual focus of the user in an environment that comprises at least the integrated touch enabled display of the computational device and the disparate display of a disparate computational device viewable by the user; and
manipulating the property of the content displayed on the disparate display, the property being manipulated based on input from the user received via the integrated touch enabled display when the visual focus information specifies that the user is visually focused on the integrated touch enabled display, wherein a manifestation of the property of the content as manipulated is displayed on the disparate display responsive to the user being visually focused on the disparate display.

11. The computational device of claim 10, the computational device being one of a smartphone or a tablet computer.

12. The computational device of claim 10, wherein the memory further comprises computer-executable instructions that, when executed by the at least one processor, cause the at least one processor to perform acts including:
identifying the property of the content for displaying on the integrated touch enabled display as a function of contextual information, the contextual information specifies that the user was last interacting with the content on the disparate display prior to the visual focus of the user switching from the disparate display.

13. The computational device of claim 12, the contextual information being based on a location of a point of gaze of the user on the disparate display prior to the visual focus of the user switching from the disparate display.

14. The computational device of claim 10, wherein the memory further comprises computer-executable instructions that, when executed by the at least one processor, cause the at least one processor to perform acts including:
detecting the visual focus information of the user.

15. The computational device of claim 10, wherein the memory further comprises computer-executable instructions that, when executed by the at least one processor, cause the at least one processor to perform acts including:
controlling a type of input receivable from the user via the integrated touch enabled display as a function of the visual focus information.

16. The computational device of claim 10, wherein the memory further comprises computer-executable instructions that, when executed by the at least one processor, cause the at least one processor to perform acts including:
controlling a level of detail of content displayed on the integrated touch enabled display as a function of the visual focus information.

17. The computational device of claim 10, wherein the content displayed on the disparate display comprises a video, and wherein the memory further comprises computer-executable instructions that, when executed by the at least one processor, cause the at least one processor to perform acts including:
displaying, on the integrated touch enabled display, a specific frame of the video when the visual focus information specifies that the user is visually focused on the integrated touch enabled display.

18. The computational device of claim 10, wherein the indication of the property of the content is displayed as part of a program guide displayed on the integrated touch enabled display.

19. A computational device, comprising:
at least one processor; and
memory that comprises computer-executable instructions that, when executed by the at least one processor, cause the at least one processor to perform acts including:
displaying content on a display;
receiving data controlling a property of the content on the display, the property of the content being manipulated based on input from a user received via a differing display of a differing computational device when visual focus information specifies that the user is visually focused on the differing display, the visual focus information indicates a visual focus of the user in an environment that comprises at least the display and the differing display viewable by the user; and displaying the content on the display with the property controlled based on the data responsive to the user being visually focused on the display.

20. The computational device of claim 19, further comprising:

transmitting contextual information to the differing computational device, the contextual information specifies that the user was last interacting with the content on the display prior to the visual focus of the user switching from the display.

* * * * *